C. R. BAILEY.
VALVE CAP.
APPLICATION FILED APR. 3, 1911.
1,051,057.
Patented Jan. 21, 1913.
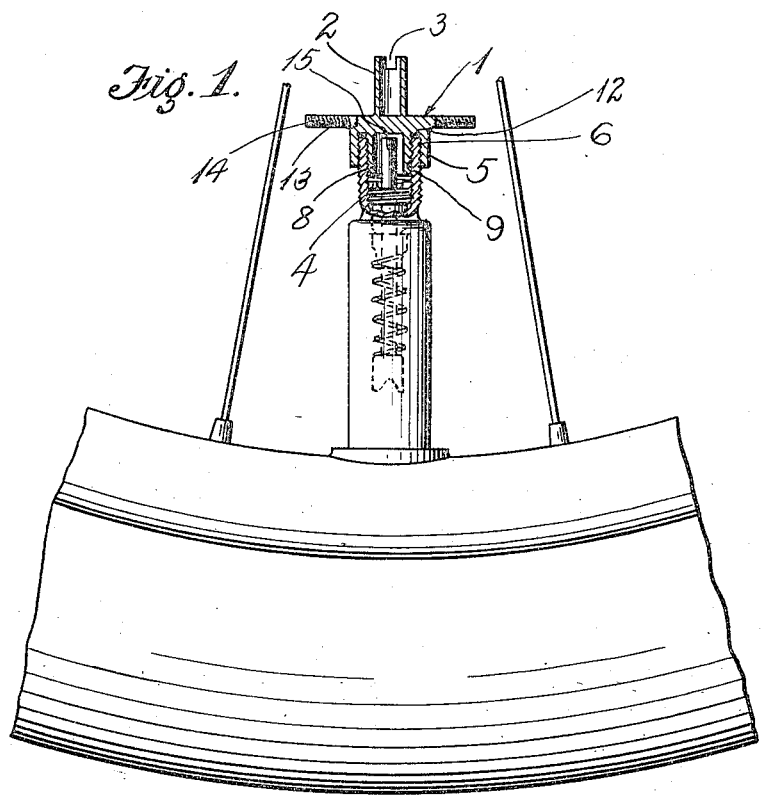
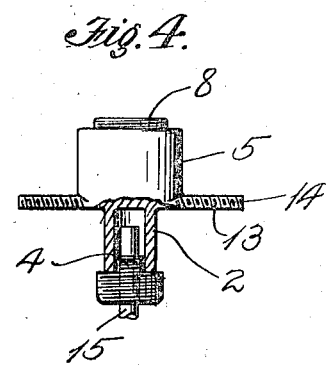
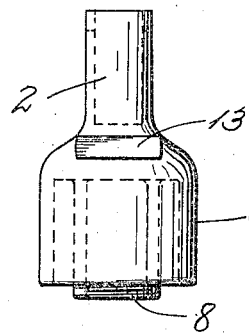
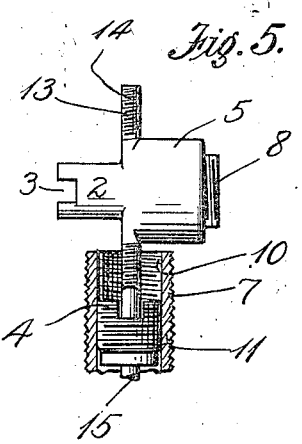
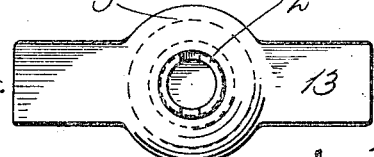
Witnesses.
E. R. Pollard
C. Severance
Inventor.
Clarence R. Bailey.
By Hazard & Strauss
Attys.

UNITED STATES PATENT OFFICE.

CLARENCE R. BAILEY, OF LOS ANGELES, CALIFORNIA.

VALVE-CAP.

1,051,057.

Specification of Letters Patent. Patented Jan. 21, 1913.

Application filed April 3, 1911. Serial No. 618,681.

*To all whom it may concern:*

Be it known that I, CLARENCE R. BAILEY, a citizen of the United States, residing at Los Angeles, in the county of Los Angeles and State of California, have invented new and useful Improvements in Valve-Caps, of which the following is a specification.

The invention relates to improvements in valve caps and has particular relation to caps for the valves of pneumatic tires for vehicles such as automobiles, motor-cycles, bicycles, and the like.

It is an object of the invention to provide a cap which may be securely secured in place over the valve of the ordinary pneumatic tire so as to form a tight joint and prevent any escape of air in the event of the valve itself being defective and not completely holding the air within the tube.

It is also an object of the invention to provide a cap with means for turning the same tightly to position, the said means also being capable of being secured into the nipple of the valve stem so as to depress the valve when it is desired to let the air out of the tire.

It is also an object of the invention to provide a cap of the class described which is capable of screwing in or unscrewing the valve mechanism for removing the said valve when it is necessary to adjust or replace the same.

In the accompanying drawing forming a part of this specification; Figure 1 is a side elevation of a portion of a vehicle tire and the valve stem thereof, showing the improved cap of the present invention applied thereto, the said cap and the nipple of the valve stem being shown in section. Fig. 2 is an enlarged side elevation of the improved cap looking at one of the actuating arms thereof from the end. Fig. 3 is a top plan view of the said cap. Fig. 4 is an enlarged view of the cap showing it in inverted position in unscrewing the valve mechanism. Fig. 5 is a similar view but showing one of the actuating arms secured into the nipple of the valve stem for depressing the valve and permitting the air within the tire to escape.

The details of the invention will now be more fully described reference being had to the drawing in which 1 indicates the body portion of the cap, and 2 a hollow projection formed upon the upper side of the cap adapted to fit over the stem of the valve so as to unscrew the valve mechanism, the said projection being provided with notches or recesses 3 for fitting upon the shoulders as 4 of the valve plug in screwing or unscrewing the same.

The cap 1 is provided with the usual flange portion 5 having screw threads 6 upon its inner surface capable of being screwed upon the valve nipple 7. The said cap is also provided with an inner concentric cylindrical portion 8 having threads upon its outer surface as at 9, adapted to engage the threads 10 formed upon the inner surface of the nipple 11. A double securing wall as 6 is formed upon the cap adapted to have a double threaded engagement with the valve nipple 11, so that when the cap is secured in place a tight joint can be made which is proof against the leakage of air, in the event of the valve mechanism being defective or leaky.

A packing as at 12 may be inserted between the concentric flanges of the cap or not as preferred, so as to further secure the cap in position without leakage of air. The cap 1 is provided with laterally projecting arms 13 preferably 2 in number and usually arranged diametrically opposite each other as indicated in Figs. 1, 3, 4 and 5. The said arms 13 are preferably flattened in shape and their outer edges are screw threaded as at 14, the width of said arms being such that they will just fit within the nipple 11 of the valve stem. The said arms may thus be screwed into the said nipple and can be made to depress the stem 15 of the valve mechanism so as to open the valve and allow the air to escape from the tire. The flattened sides of the arms 13 afford ample spaces for the exit of the air. Both of said arms are usually screw threaded in this manner so that either one can be inserted in the end of the valve stem and screwed down therein to open the valve. When it is necessary to remove the valve mechanism the cylindrical projection 2 is inserted in the end of the valve stem until the recesses 3, fit upon the shoulders 4 of the valve plug and by turning the cap by means of the arms 13, the said plug may be screwed out of or into position.

It will be evident from the above description that the improved cap is admirably adapted for use in connection with the ordinary vehicle tire valve stem. The arms 13 not only afford a suitable means for securing the cap tightly in place and removing the same again but by reason of their capability for being screwed into the end of the valve stem they afford a positive means for holding the valve open whenever it is necessary to deflate the tires. The double securing wall or concentric flanges as above intimated afford means for tightly closing the valve stem whether the valve mechanism is defective or not.

What I claim is:—

1. A cap for valve stems comprising a body portion having laterally projecting flattened arms, the said arms having threads upon their edges whereby they may be screwed into a valve stem for opening the valve, the said cap also having an inner sleeve provided with exterior threads adapted to engage the same threads that are engaged by the said arms when the cap is to be tightly screwed upon the valve stem.

2. A cap for valve stems comprising a body portion having laterally projecting lugs, cut away, on their upper and lower sides to form operating arms, threads on their edges to engage the internal threads of the valve stem and also afford a roughened finger hold when securing the valve cap.

In witness that I claim the foregoing I have hereunto subscribed my name this 25th day of March, 1911.

CLARENCE R. BAILEY.

Witnesses:
 EDMUND A. STRAUSE,
 EARLE R. POLLARD.

---

Copies of this patent may be obtained for five cents each, by addressing the "Commissioner of Patents, Washington, D. C."